US012355777B2

(12) United States Patent
Broadworth

(10) Patent No.: US 12,355,777 B2
(45) Date of Patent: *Jul. 8, 2025

(54) CONFERENCE SECURITY FOR USER GROUPS

(71) Applicant: Level 3 Communications, LLC, Denver, CO (US)

(72) Inventor: Andrew J. Broadworth, Thornton, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,430

(22) Filed: Jun. 13, 2024

(65) Prior Publication Data
US 2024/0333720 A1 Oct. 3, 2024

Related U.S. Application Data

(63) Continuation of application No. 17/511,013, filed on Oct. 26, 2021, now Pat. No. 12,015,616.

(60) Provisional application No. 63/136,864, filed on Jan. 13, 2021.

(51) Int. Cl.
H04L 9/40 (2022.01)
H04L 65/403 (2022.01)

(52) U.S. Cl.
CPC ............ H04L 63/104 (2013.01); H04L 63/08 (2013.01); H04L 63/102 (2013.01); H04L 65/403 (2013.01)

(58) Field of Classification Search
CPC ..... H04L 63/104; H04L 63/08; H04L 63/102; H04L 63/0876; H04L 63/101; H04L 65/403

See application file for complete search history.

(56) References Cited

U.S. PATENT DOCUMENTS

| 7,881,268 | B1 | 2/2011 | Tong |
| 8,234,335 | B1 | 7/2012 | Haldar |
| 9,325,749 | B2 * | 4/2016 | Bangor ................ H04L 65/403 |
| 9,356,904 | B1 | 5/2016 | Ho |
| 9,367,823 | B1 | 6/2016 | Mihalik |
| 9,401,938 | B2 | 7/2016 | Bakaev |

(Continued)

FOREIGN PATENT DOCUMENTS

| WO | WO-0111845 A2 * | 2/2001 | ......... H04L 63/0815 |
| WO | WO-2009105298 A2 * | 8/2009 | ........... G06F 3/0481 |

(Continued)

Primary Examiner — Sarah Su

(57) ABSTRACT

Systems and methods for conference security based on user groups are disclosed. In examples, a set of attendees (e.g., in a collaboration group) may be allowed access to a meeting by a host user with a specified access permission. The collaboration group may be in the network hosting the meeting or outside of the network. An attendee requesting access to the meeting may be verified based on the attendee's identity and membership status of the collaboration group. If an attendee's identity is not identified or if the attendee is not a member of the collaboration group, the requesting attendee may be denied access to the meeting. If the requesting attendee's identity is verified and the attendee is a member of the collaboration group, the attendee is allowed access to the meeting with their specified access permission.

17 Claims, 8 Drawing Sheets

(56) References Cited

U.S. PATENT DOCUMENTS

| | | | |
|---|---|---|---|
| 10,708,180 B2* | 7/2020 | Ellison | H04L 65/1069 |
| 11,895,103 B2* | 2/2024 | Pati | H04W 4/80 |
| 12,015,616 B2* | 6/2024 | Broadworth | H04L 63/0876 |
| 2004/0111612 A1 | 6/2004 | Choi | |
| 2013/0263020 A1 | 10/2013 | Heiferman | |
| 2013/0336170 A1* | 12/2013 | Broadworth | H04L 65/403 370/260 |
| 2014/0095607 A1 | 4/2014 | Fraccaroli | |
| 2014/0278675 A1 | 9/2014 | DeLuca | |
| 2015/0350266 A1 | 12/2015 | O'Brien | |
| 2016/0261653 A1 | 9/2016 | Kin | |
| 2017/0099296 A1 | 4/2017 | Fisher | |
| 2017/0118271 A1 | 4/2017 | Reyes | |
| 2018/0018636 A1 | 1/2018 | Bisti | |
| 2018/0020004 A1 | 1/2018 | Ferguson | |
| 2018/0109570 A1* | 4/2018 | Kowal | H04L 65/403 |
| 2018/0113845 A1 | 4/2018 | Aggarwal | |
| 2018/0367484 A1 | 12/2018 | Rodriguez | |
| 2019/0020699 A1 | 1/2019 | Ross | |
| 2021/0014287 A1 | 1/2021 | Kimball | |
| 2021/0112044 A1* | 4/2021 | Rutherford-Jenkins | H04L 51/42 |
| 2021/0160276 A1 | 5/2021 | Broadworth | |
| 2021/0399911 A1 | 12/2021 | Jorasch | |
| 2021/0409825 A1 | 12/2021 | Meyer | |
| 2022/0200979 A1* | 6/2022 | Wenzel | H04L 65/4015 |
| 2022/0224693 A1 | 7/2022 | Broadworth | |
| 2022/0284402 A1 | 9/2022 | Vangala | |
| 2023/0092334 A1 | 3/2023 | Vendrow | |
| 2024/0414152 A1* | 12/2024 | Ganapathy Achari | G06F 11/2257 |

FOREIGN PATENT DOCUMENTS

| | | | | |
|---|---|---|---|---|
| WO | WO-2017074848 A1 * | 5/2017 | | G06F 21/604 |
| WO | WO-2018067220 A1 * | 4/2018 | | H04L 51/04 |

* cited by examiner

CONFERENCE SECURITY FOR USER GROUPS

INTRODUCTION

Telecommunication networks provide collaborative environments to allow multiple users of the network to communicate collaboratively (e.g., a virtual meeting such as a conference call, video conference, teleconference, webinar, etc.). The quantity of participants provided access to a collaborative environment may range from a few users to several thousand users. In some instances, collaboration environments may be restricted to specific participants. In such cases, security measures may be established to restrict access to those specific participants.

It is with respect to this general technical environment that aspects of the present technology disclosed herein have been contemplated. Furthermore, although a general environment is discussed, it should be understood that the examples described herein should not be limited to the general environment identified herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Among other things, aspects of the present disclosure include systems and methods for conference security based on a user group or user ecosystem. Aspects disclosed herein include a method for conference security based on an in-network group. The method includes receiving instructions at a server to schedule a virtual meeting and to invite a group to the meeting, the group including a set of attendees. The method also includes determining, by the server, that an indication of the group is stored in a network associated with the server. Additionally, the method includes sending a meeting address from the server to a first user device associated with a first user in the set of attendees. The method further includes receiving, at the server, a request from the first user device to access the virtual meeting and authorizing the first user device to access the virtual meeting, by the server, based on a membership status of the first user with the group.

In an example, the group consists entirely of the set of attendees. In another example, determining that the group is in the network includes determining that the first user of the set of attendees is in the network. In a further example, the set of attendees is a contact list of the administrative user. In yet another example, the contact list is associated with one of: a social interest; an education class; or an organization. In still a further example, the method further includes in response to authorizing the first user to access the virtual meeting, providing, from the server to the first user, access to the virtual meeting. In still a further example, the meeting address is a uniform resource locator (URL).

In another example, authorizing the first user to access the virtual meeting comprises: verifying an identity of the first user. In a further example, the identity of the first user is verified based on a user credential, the user credentials including one of: a username; an email address; an internet protocol (IP) address of a device of the first user; or a media access control address (MAC) address of the device of the first user. In yet another example, verifying the identity of the first user comprises: receiving, at the server, the user credential from the first user; and comparing the user credential with stored user information in a data store in the network. In still a further example, authorizing the first user to access the virtual meeting further comprises: verifying a membership status of the first user for the group.

In another example, verifying the membership status is based on the verified identity and further includes comparing the verified identity with stored membership information in a data store in the network. In a further example, authorizing the first user to access the virtual meeting includes implementing a lightweight directory access protocol (LDAP). In yet another example, the virtual meeting is a teleconference. In still a further example, the membership status is one of: active; or inactive.

In another aspect, a method for conference security based on a third-party group is disclosed. The method includes receiving instructions at an in-network server to schedule a virtual meeting and to invite a third-party group to the meeting, the third-party group including a set of attendees. The method includes determining, by the in-network server, that the third-party group is in a third-party network including a third-party server. Additionally, the method includes sending a meeting address from the in-network server to a first user device associated with a first user in the set of attendees and receiving, at the in-network server, a request from the first user device to access the virtual meeting. Additionally, the method includes sending, from the in-network server, an authorization request to the third-party server to authorize the first user to access the virtual meeting and receiving an authorization of the first user from the third-party server at the in-network server. The method also includes hosting, at the in-network server, the virtual meeting.

In an example, the authorization request to the third-party server includes user credentials of the first user and an indication of the virtual meeting. In another example, the authorization is based on an identity of the first user and the first user's membership status with the group. In a further example, the method further includes in response to receiving authorization from the third-party server, allowing the first user to access to the virtual meeting at the in-network server.

It is to be understood that both the foregoing general description and the following Detailed Description are explanatory and are intended to provide further aspects and examples of the disclosure as claimed.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

Figure 1:
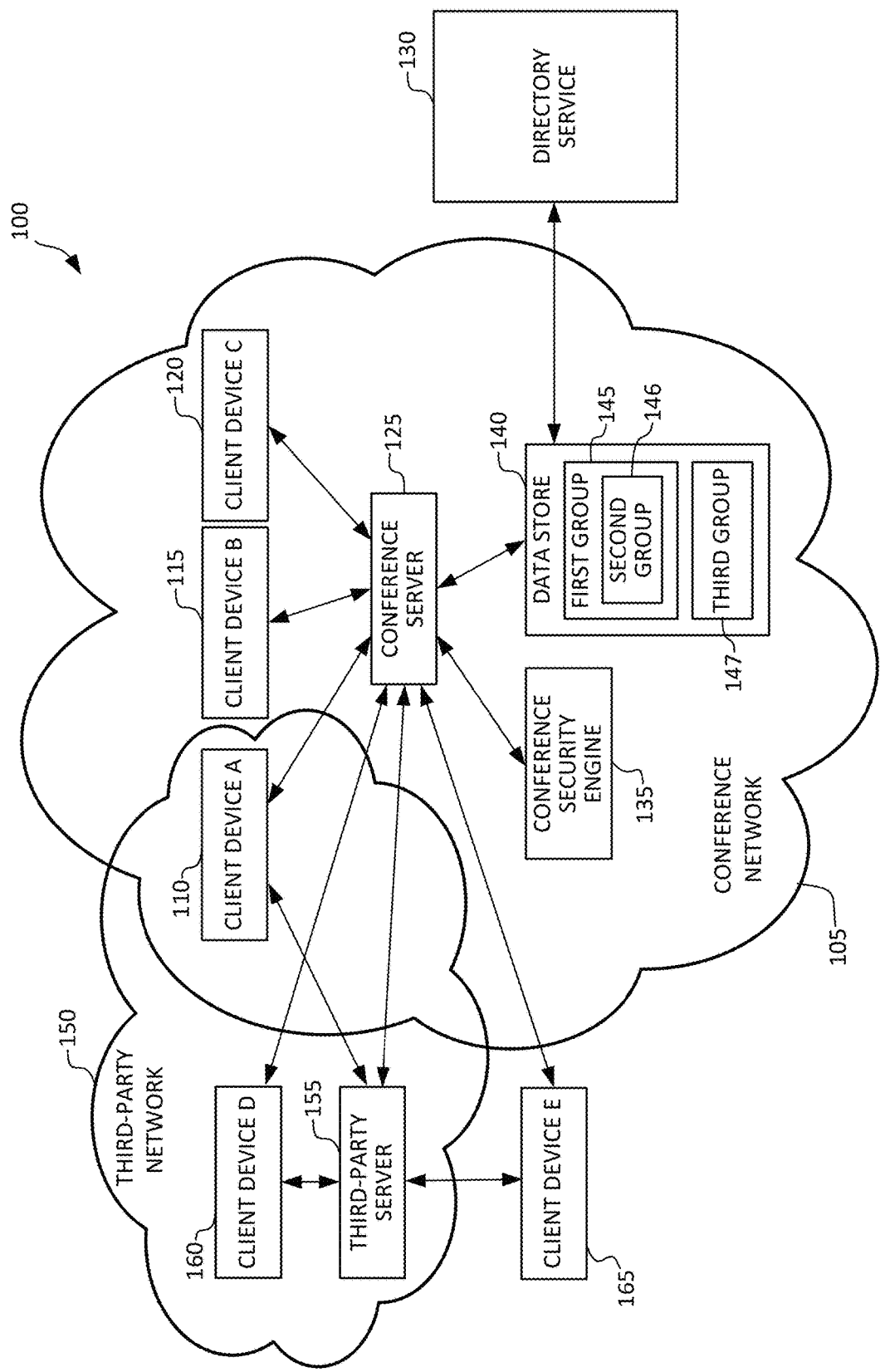
FIG. 1 illustrates an overview of an example system in which aspects of a conference security system in a user ecosystem may be practiced.

While examples of the disclosure are amenable to various modifications and alternative forms, specific aspects have been shown by way of example in the drawings and are described in detail below. The intention is not to limit the scope of the disclosure to the particular aspects described. On the contrary, the disclosure is intended to cover all modifications, equivalents, and alternatives falling within the scope of the disclosure and the appended claims.

DETAILED DESCRIPTION

As discussed briefly above, access to collaboration environments may be restricted to specific participants by establishing security measures. One security measure is to restrict access to users who have a meeting address (e.g., only provide a meeting address to specific users without secondary authentication information). This restriction allows anyone with the meeting address to access the meeting, regardless of the user's identity. Thus, if a meeting address is accidentally forwarded, stolen, or guessed, then uninvited users may still access the environment.

Another security measure is to provide an access key (e.g., password, PIN, etc.) in addition to the meeting address. Although this restriction prevents uninvited users from accessing the environment due to guessing the meeting address, uninvited users may still undesirably enter the environment if the access key is accidentally forwarded or stolen. Moreover, this security measure places an additional burden on users to maintain both a meeting address and an access key to verify the user's identity.

Additionally, selection of meeting attendees (otherwise referred to as users or participants) may be individual attendee selection or a group of attendees. Selection of a group may reduce the time to select or enter individual attendee information, reduce the likelihood that a meeting attendee is forgotten or incorrect users are invited, or reduce typographical errors. Some applications (e.g., Facebook, Slack, Teams, Zoom, etc.) allow for creation of user groups. Selection of a group, rather than individual entries of meeting attendees, may reduce the burden on the host, as described above. Invitations sent to users of a user group, however, still face the security concerns addressed above.

Among other things, the systems and methods disclosed herein address these circumstances by providing conference security based on a user group invited to the meeting (e.g., a user group may include a set of meeting attendees). A user group may be created and stored on a network. Before admittance of a user to the meeting, an identity of an attendee may be identified based on user credentials (e.g., username, email address, name, or other user-specific information). Based on the verified identity of the user, a membership status of the user may be verified to determine if the user is authorized to access the meeting. By authorizing a user based on membership status in a user group, a meeting attendee does not need to keep track of additional information (e.g., an access key). Additionally, if the meeting address is accidentally forwarded, stolen, or guessed, then the uninvited user does not have user credentials of the invited attendee. In this situation, the uninvited user is prevented from accessing the meeting, as they do not have the credentials of the invited user.

Even if the server validates the uninvited user's credentials, the validated credentials are checked against a known membership status of a group for the user to be allowed access to the collaborative environment (e.g., virtual meeting, such as a teleconference, audio conference, video conference, web conference, webinar, or any other telephonic or online environment with multiple users present). Thus, the systems and methods described herein reduce administrative burden for inviting attendees to an environment (by implementing selection of a user group), reduce invited user burden (by not requiring a second piece of information such as an access key), and increase security (by verifying a user's identity with credentials and determining if the identified user is a member of the invited user group). With these concepts in mind, several examples of methods and systems for conference security based on user groups are discussed below.

FIG. 1 illustrates an overview of an example system 100 in which aspects of conference security based on a user group (e.g., a first group 145, a second group 146, or a third group 147) may be practiced. As shown, client devices (e.g., client device A 110, client device B 115, client device C 120, client device D 160, and client device E 165) may be inside or outside of one or more networks (e.g., conference network 105 and third-party network 150). For example, client devices may be inside the conference network 105 (e.g., client device A 110, client device B 115, and client device C 120), inside of the third-party network 150 (e.g., client device A 110 and client device D 160), inside of both networks (e.g., client device A 110), or outside of both networks (e.g., client device E 165). Although not shown, each of the client devices may each be associated with a user (e.g., client device A 110 associated with user A, client device B 115 associated with user B, client device C 120 associated with user C, client device D 160 associated with user D, and client device E 165 associated with user E).

The networks (e.g., the conference network 105 and the third-party network 150) may be associated with an application or organization such that a client device on the network is logged in via a login to the application or organization. The network may be any network or any combination of networks that allows for a user group and/or a collaborative environment (e.g., audio conference, video conference, webinar, etc.), such as a personal area network (PAN), local area network (LAN), wireless local area network (WLAN), campus area network (CAN), metropolitan area network (MAN), wide area network (WAN), storage-area network, system-area network, passive optical local area network (POLAN), enterprise private network (EPN), virtual private network (VPN), etc.

The conference network 105 includes in-conference-network client devices (e.g., client device A 110, client device B 115, and client device C 120), a conference server 125, conference security engine 135, and data store 140. The conference server 125 may manage allocation of resources in the conference network 105 and tracks if a client device or resource is inside or outside of the conference network 105. For example, the conference server 125 may determine if a client device is inside or outside of the conference network 105 based on device identification information (e.g., internet protocol address, media access control address, or other device-specific information) that may be stored in the data store 140. Alternatively, the conference server 125 may determine if a client device is inside or outside of the conference network 105 based on user credentials (e.g., login, username, password, PIN, key, alias, etc.) provided by the user of the client device. The conference server 125 comprises, or is communicatively coupled to, the conference security engine 135, and the data store 140 to provide a collaborative environment to the users of the client devices.

The data store 140 of the conference network 105 may store device identification information and user credentials. The conference server 125 may compare information received from a client device with device identification information and user credentials to verify the identity of a user of a client device. Additionally, the data store 140 may include a directory, user groups (e.g., first group 145, second group 146, and third group 147), and group information. As further described herein, the conference server 125 may determine a user's membership status (e.g., active/included or inactive/excluded) in a group to authorize a user's access to a collaboration environment. The data store 140 may associate a membership status with the stored device identification information and user credentials in a directory such that the conference server 125 may determine membership status by finding a user in the directory. Alternatively, the data store 140 may include a set of group members for a group, such that the conference server 125 may determine membership status by finding a group and reviewing the set of group members. For example, user B of client device B is included in a set of group members for a first group 145 (e.g., active membership status of user B for the first group 145). The conference server 125 may determine user B's membership status regarding the first group by either looking up user B in a directory and finding a membership status associated with the directory listing, or looking up the first group 145 and determining if user B is listed in the set of group members for the first group 145.

A second set of group members for a second group 146 may be associated with a first set of group members for a first group 145 (e.g., a subset of the first group). In an example where the second set is a subset of the first set, removal of a member from the first set removes the member from the second set and addition of a member to the second set adds the member to the first set. Alternatively, sets of group members may be independent of each other. For example, a first set of group members for a first group 145 is independent of a third set of group members for a third group 147. Membership status in a group may change (e.g., as requested by a user). This is further discussed in relation to FIG. 4, below.

A group (e.g., the first group 145, the second group 146, or the third group 147) may be established in a conferencing application that is hosted in the conference network 105, in the cloud, or otherwise. Alternatively, a group may be established in the conference network 105 by querying a directory service 130, such as Active Directory® by Microsoft®, or another application hosted within the conference network 105 or in a third-party network 150. The established group is used to identify group members for the inviting group members to a conference and to authenticate a user that attempts to join the conference (e.g., based on membership status of the user in the group at the time the user attempts to join the conference).

The third-party network 150 includes in-third-party-network client devices (e.g., client device A 110, and client device D 160) and a third-party server 155. Although not shown, the third-party network 150 may include additional components similar to those of the conference network 105 (e.g., engine and data store).

Instead of verifying an identity of a user and determining authorization of access to a collaborative environment at the conference network 105, a third-party server 155 may perform the verification and authorization determinations and communicate the findings to the conference server 125. Based on information received by the conference server 125 from the third-party server 155, a user may be admitted into the collaborative environment.

Figure 2A:
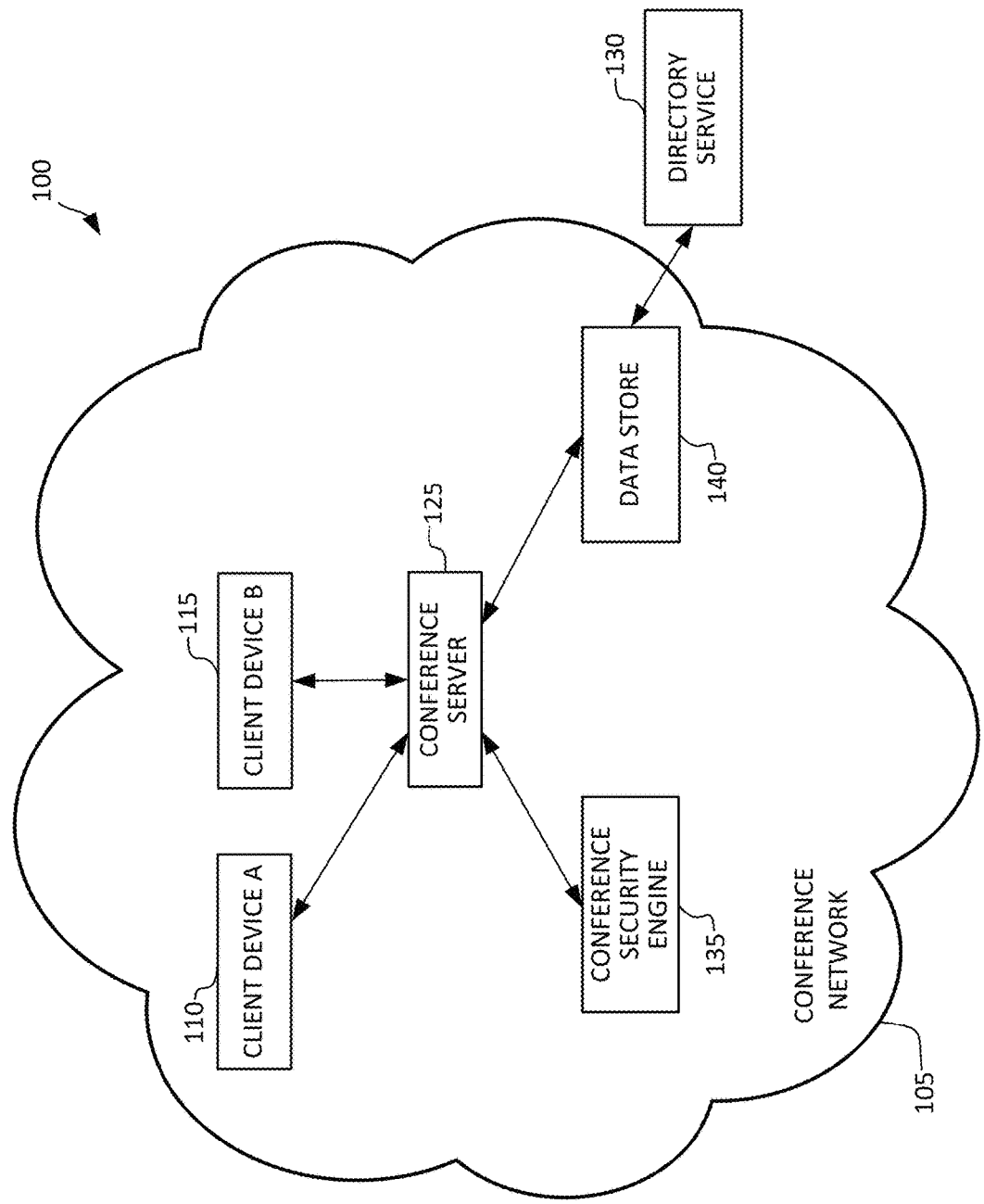
FIG. 2A illustrates an example system in which conference security for a conference is established between two devices in a conference network.
Figure 2B:
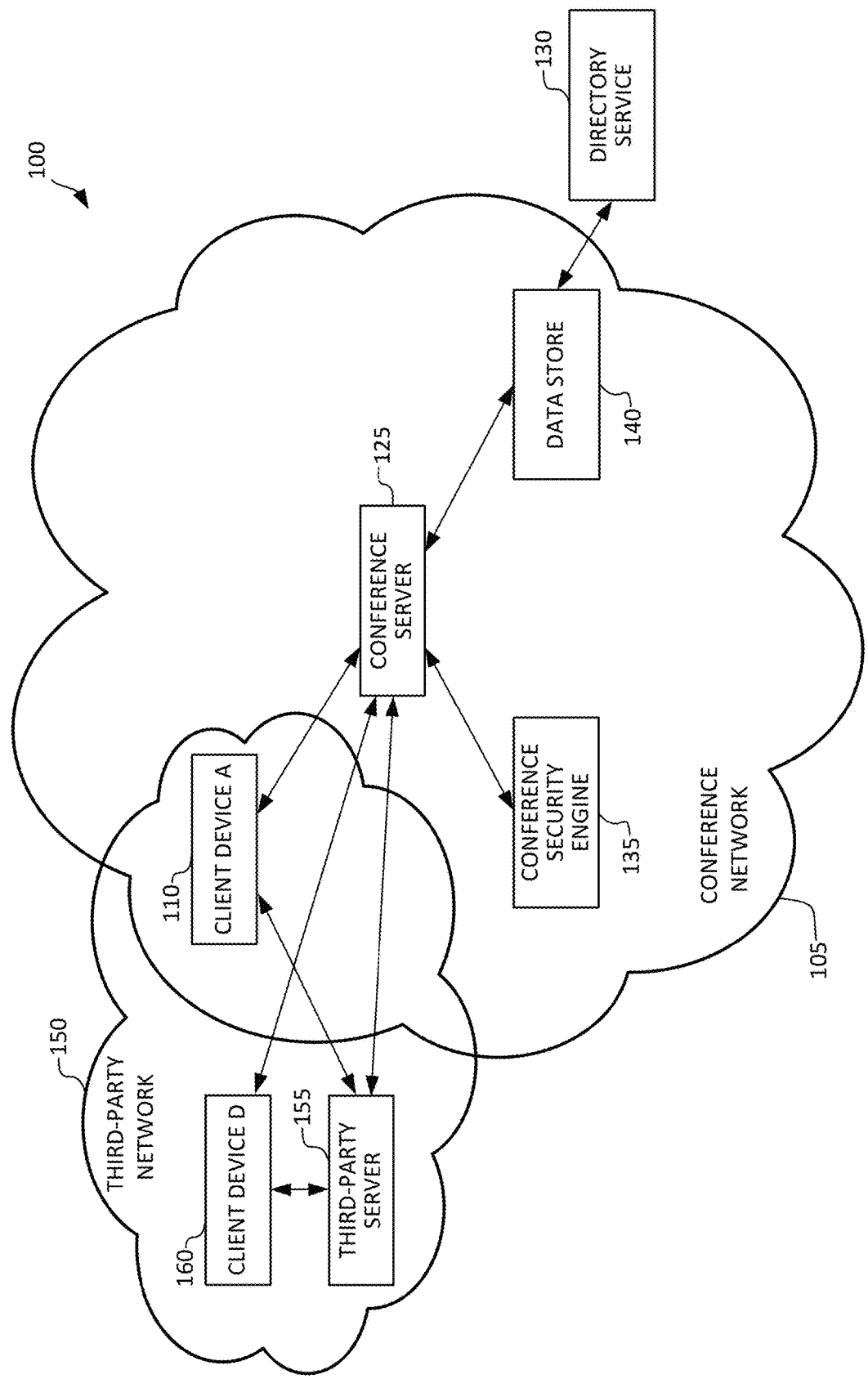
FIG. 2B illustrates an example system in which conference security for a conference is established between a first device in both a conference network and a third-party network and a second device in the third-party network.
Figure 2C:
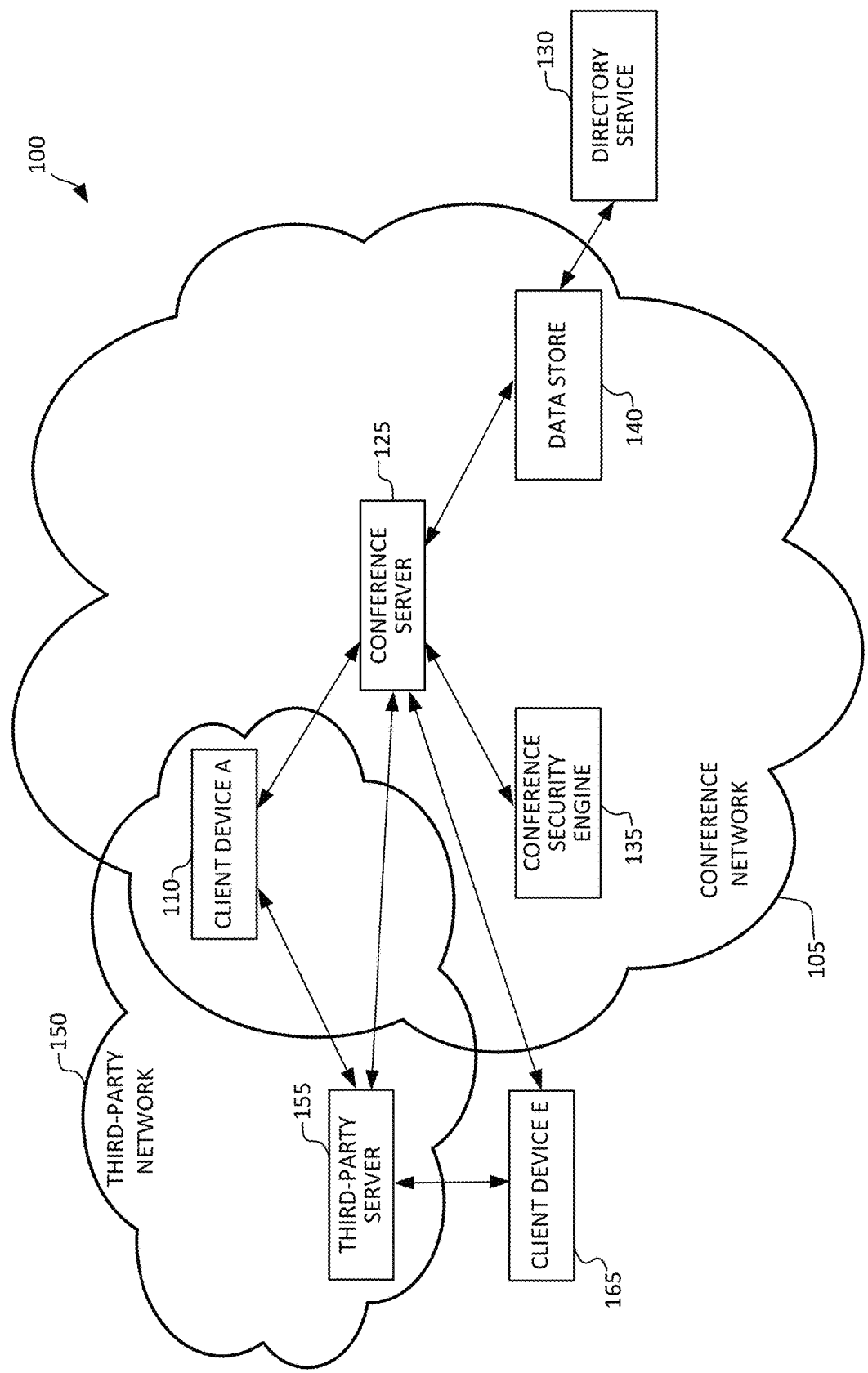
FIG. 2C illustrates an example system in which conference security for a conference is established between a first device in both a conference network and a third-party network and a second device outside of both of the conference network and the third-party network.

FIGS. 2A-C show example systems of FIG. 1. The three system layouts shown in FIGS. 2A-C are provided for the purposes of additional discussion and are not exhaustive variants of FIG. 1. Thus, other systems based on FIG. 1 are appreciated and may include any number of components in any configuration.

FIG. 2A illustrates an example system 100 for establishing conference security for two devices in a conference network 105 in a collaborative environment. As shown, the conference network 105 includes client device A 110 of user A, client device B 115 of user B, conference server 125, conference security engine 135, and data store 140. In this example, user A is a host of a collaboration conference in a collaborative environment. A host may be an administrator or may be a user with privileges to schedule a meeting, invite attendees to a meeting, create groups (e.g., a group owner), or invite groups to a meeting. The conference server 125 allows user A, via client device A 110, to set up a collaborative environment and specify access to group G of which user B of client device B 115 is included/active member. The conference server 125 then provides a meeting address to each active member of group G (including user B). User B sends credentials to the conference server 125 that are verified using information in the data store 140. The conference server 125 determines a membership status of the verified credentials for group G by referencing the data store 140. If the conference server determines that the verified credentials are associated with an active membership in group G, then the conference server allows access of user B to the collaborative environment on client device B 115.

FIG. 2B illustrates an example system 100 for establishing conference security for a collaborative environment of client device A 110 in both a conference network 105 and a third-party network 150 and client device D 160 in the third-party network 150. As shown, the conference network 105 includes client device A 110 of user A, conference server 125, conference security engine 135, and data store 140. The third-party network 150 includes client device A 110 of user A, client device D 160 of user D, and third-party server 155. In this example, like in FIG. 2A, user A is a host of a collaborative environment. Unlike FIG. 2A, here the third-party server 155 performs identification and membership status of user D in group G. The conference server 125 allows user A of client device A 110 to set up a collaborative environment and specify access to group stored on the third-party server 155, of which user D of client device D 160 is included/active member. The conference server 125 requests group information from the third-party server 155 (e.g., contact information for each user of the set of group members invited to the meeting). After receiving contact information for the group members, the conference server 125 provides a meeting address to each group member (including user D). User D sends credentials to the third-party server 155 that are verified by the third-party server 155. Alternatively, user D may send credentials to the conference server 125 to be forwarded to the third-party server 155 for verification. The third-party server 155 also determines a membership status of the verified credentials for the invited group. The third-party server 155 then sends confirmation or rejection to the conference server 125 of user D's authorization to join the collaborative environment. If authorized, the conference server 125 allows access of user D to the collaborative environment via client device D 115.

FIG. 2C illustrates an example system 100 for establishing conference security for a collaborative environment of client device A 110 in both a conference network 105 and a third-party network 150 and client device E 160 outside of the conference network 105 and the third-party network 150. As shown, the conference network 105 includes client device A 110 of user A, conference server 125, conference security engine 135, and data store 140. The third-party network 150 includes client device A 110 of user A and third-party server 155. Additionally, the system 100 shows client device E 165 outside of both networks. In this example, like in FIGS. 2A and 2B, user A is a host of a collaborative environment. Because client device E 165 is outside of both networks, user E cannot be authenticated based on association with an invited group on either the conference server 125 or the third-party server 155. Thus, in this example, user E may provide additional information for authentication (e.g., access key, PIN, password, turning on a video feed, additional credentials, etc.). The conference server 125 allows user A of client device A 110 to set up a collaborative environment and specify access to group including contact information for user E. The conference server 125 provides a meeting address and access information to client device E of user E. User E sends credentials and the access information to either the conference server 125 or the third-party server 155 (to indicate authorization to the conference server 125) that are verified. If authorized, the conference server 125 allows access of user E to the collaborative environment on client device E 115.

Figure 3A:
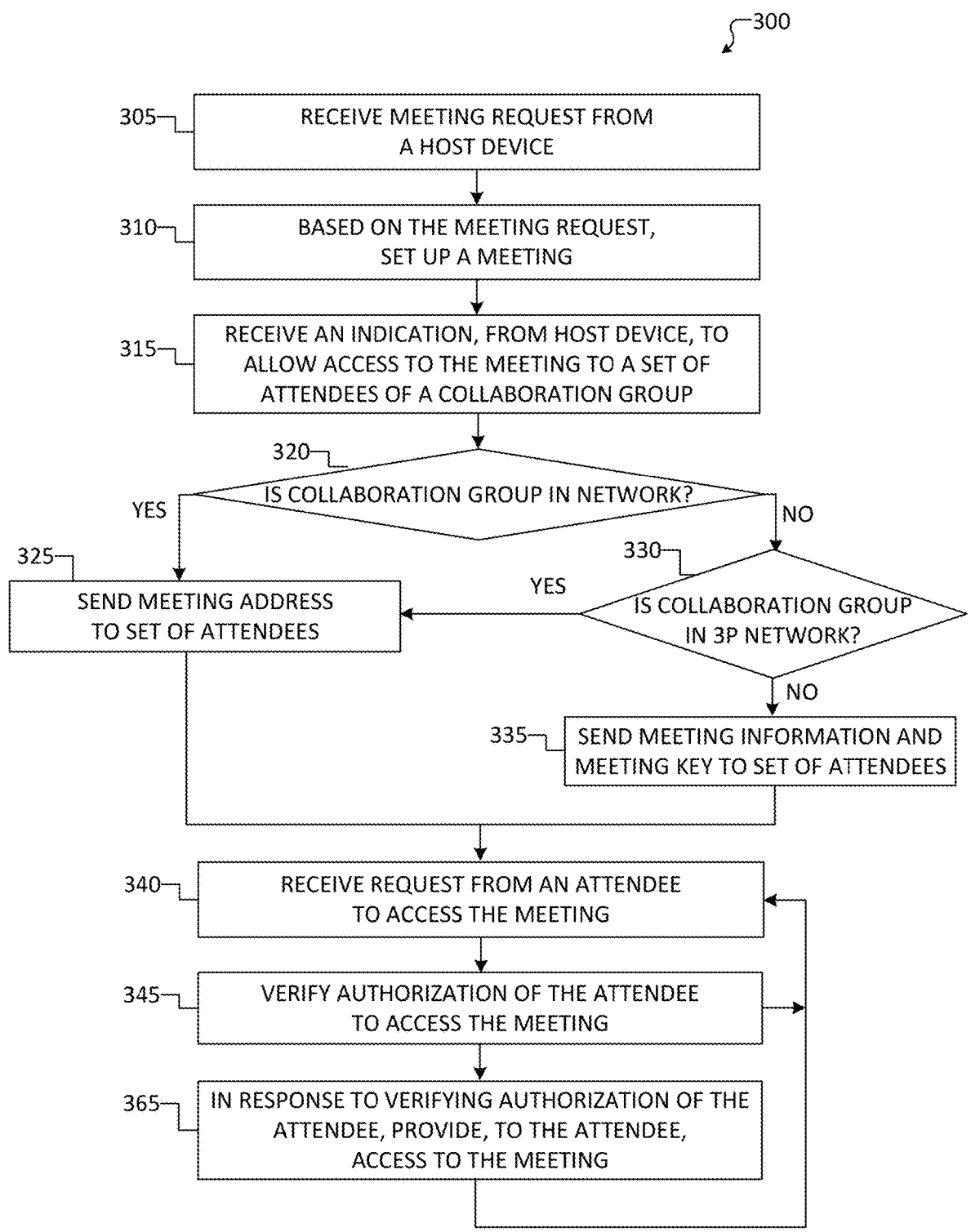
FIG. 3A illustrates an example method for providing a secure conference by verifying attendee authorization to access the conference.
Figure 3B:
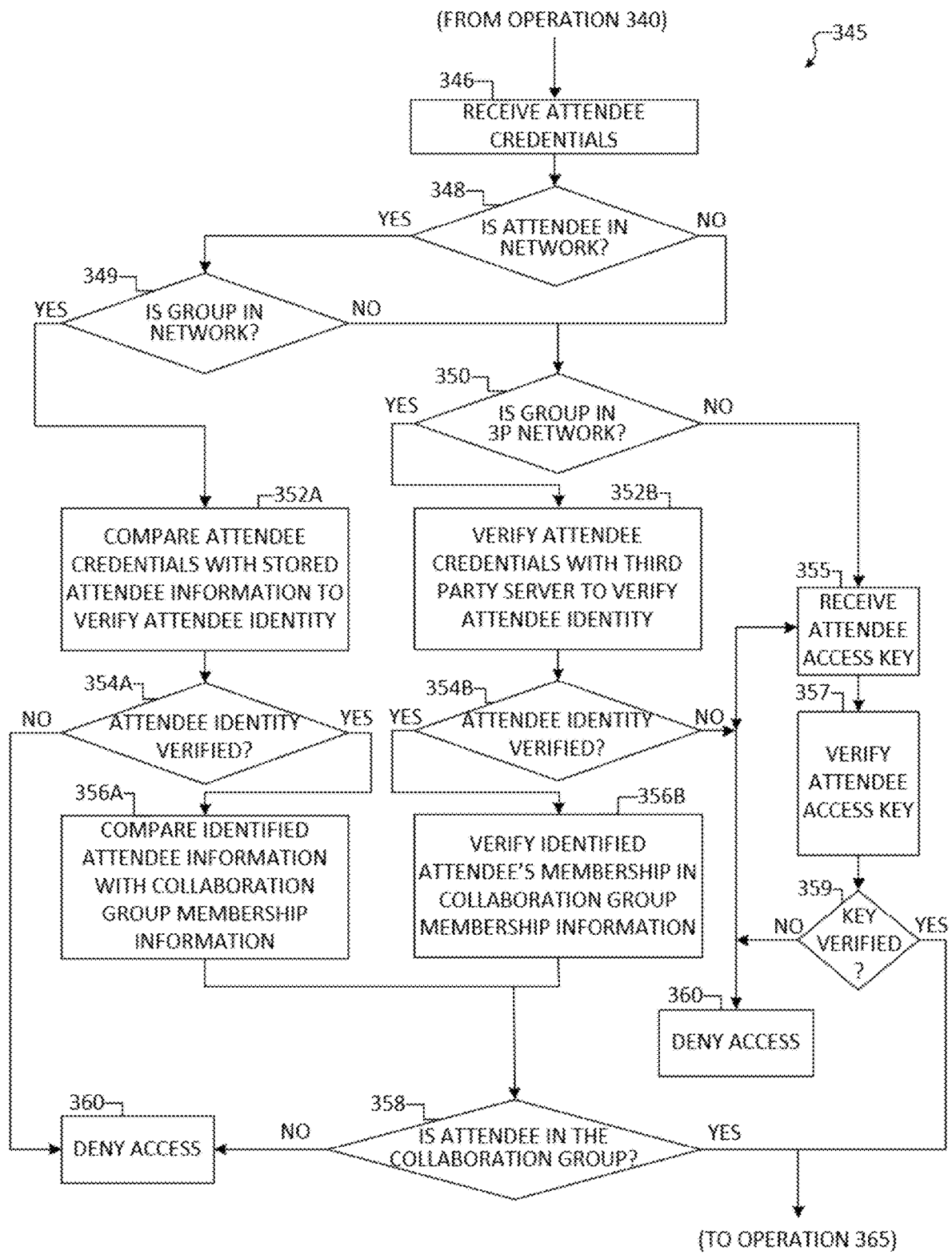
FIG. 3B illustrates an example method for verifying authorization of the attendee to access the conference.
Figure 4:
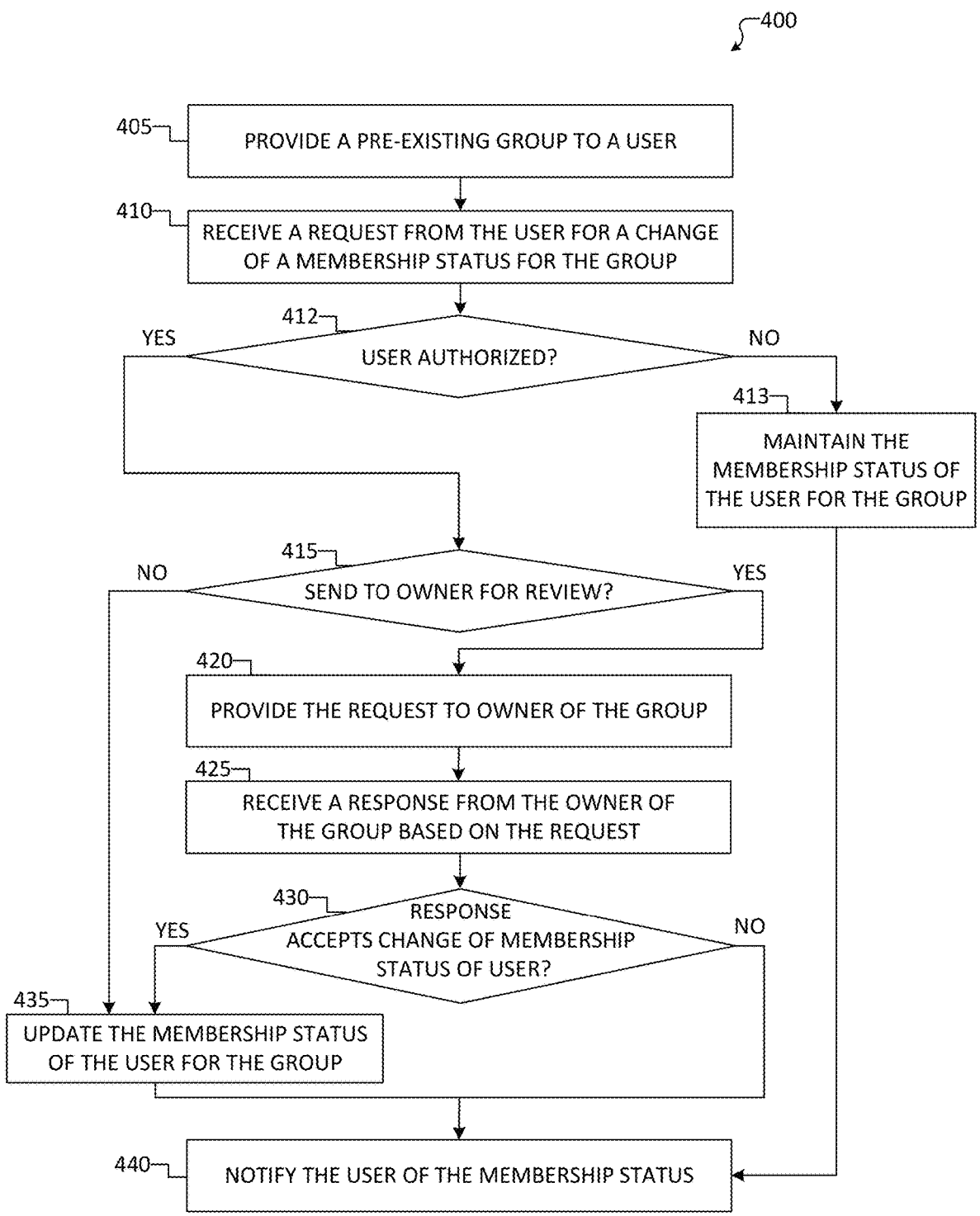
FIG. 4 illustrates an example method for changing a set of group members in a collaboration group.

FIGS. 3A, 3B, and 4 show example methods according to the disclosed technology. The example methods include operations that may be implemented or performed by the systems and devices disclosed herein. For example, conference server 125 depicted in FIGS. 1 and 2A-C may perform the operations described in the methods. In addition, instructions for performing the operations of the methods disclosed herein may be stored in a memory of the conference server 125 (e.g., system memory 504 described in FIG. 5).

FIG. 3A illustrates an example method 300 for providing a secure conference by verifying attendee authorization to access the conference. Method 300 includes an invitation stage (e.g., steps 305-335) and an authorization stage (e.g., steps 340-365). Method 300 begins at operation 305 where a meeting request is received from a host device (e.g., client device A 110). The meeting request may include meeting information, such as a time, duration, title, note, permissions, etc. The host device may be in-network (e.g., conference network 105). At operation 310, based on the meeting request, a meeting is created. The meeting is based on the meeting information specified, such as a time, duration, title, note, permissions, etc.

At operation 315, an indication is received from the host device to allow access to the meeting to a set of attendees. The set of attendees may be part of a collaboration group. The indication may be based on a host user selecting a preestablished collaboration group (e.g., at a user interface) or based on the host user creating a collaboration group for the set of attendees. Alternatively, the collaboration group may be temporarily created on an ad hoc basis for each meeting. For example, an ad hoc collaboration group is created for a set of attendees that are each individually selected by the host user to be allowed access to the meeting. The collaboration group (e.g., preestablished collaboration group, newly formed collaboration group, or ad hoc collaboration group) may be presented to the host user as a suggestion. For example, a collaboration group may be suggested based on invitees for past meetings, attendees of past meetings, user requests to join meetings, device identifiers, user identifiers, a common network, common organization, common interest, email contact list, phone contact list, etc.

Multiple collaboration groups may be selected by the host user for access to a meeting. As described herein, each collaboration group is associated with a set of attendees. The set of attendees may include one or more attendees. The host user may assign an access permission for the meeting to each collaboration group. Access permissions may allow access to, or alternatively limit access to, one or more features of the meeting, such as listen, view, send video, send audio, screen share, annotate, record, send text (e.g., chat, Q&A, etc.), receive text, mute other attendees, stop video of other attendees, remove attendees from the meeting, add attendees to the meeting, view attendee list, poll, raise hand, start meeting, end meeting, assign attendee roles (e.g., panelist, presenter, host, viewer, etc.), or other input or output permissions associated with the meeting. For example, in a teacher-student-parent collaboration environment, a meeting may be a virtual classroom with the teacher as the host user and Students A-Z in the class. The teacher may create a class meeting and allow access to the meeting to Students A-N (e.g., a first collaboration group) with an associated access permission to listen, talk, and share video (e.g., a first access permission). Additionally, the teacher may allow access to the meeting to Parents A-N (e.g., a second collaboration group) with an associated access permission to listen but not to share an input, such as video, sound, etc. (e.g., a second access permission).

At determination 320, it is determined whether the collaboration group is in-network. A collaboration group is to be considered "in-network" if the collaboration group is in a collaboration application hosted by the collaboration network for the meeting. Alternatively, a collaboration group is considered to be "in-network" if the collaboration group is maintained in an application or directory service 130 that is controlled or hosted by the same collaboration network that is hosting the collaboration application. For the purposes of this example, all attendees of the set of attendees are determined to be in-network or out-of-network. In an example where a subset of attendees is in-network and a subset of attendees are out-of-network, determination 320 may be made for a subset of attendees or independently for each attendee. An example of the collaboration group being in-network is shown in FIG. 2A with client device A and client device B in conference network 105. Determination 320 may be made in response to receiving an indication from a host device to allow collaboration group access to a meeting. In an example where the collaboration group is provided to the host device (e.g., not created at the host device), determination 320 may be known prior to receiving the indication at operation 315.

If it is determined that the collaboration group is in a collaboration application hosted by the collaboration network or another application or directory service 130 that is controlled or hosted by the same collaboration network that is hosting the collaboration application, flow branches "YES" to operation 325 where a meeting address is sent to a set of attendees for the meeting. A meeting address may be a uniform resource locator (URL), alternate base URL, hyperlink, info card, etc. associated with the meeting. If the group is in-network, then the collaboration server may access the group membership status information directly in the data store or by querying, within the network, the application or service that maintains the group membership listing (e.g., directory service 130). In examples, the collaboration server may provide authentication information for a host user to the service or application maintaining the group membership (e.g., directory service 130) to verify that the host user has access to the collaboration group within the network. Thus, at the invitation stage, for an in-network collaboration group, a host user's access to the group may be verified and a meeting address may be sent to the set of attendees without secondary authentication information (e.g., without an access key or any other information to verify a user's identity or group membership).

If, however, it is determined that the collaboration group is not in-network, flow branches "NO" to determination 330. A collaboration group is not in-network when membership status of users in the collaboration group is not accessible in-network (e.g., membership statuses of users for the collaboration group are not stored on an in-network data store). At determination 330, it is determined if the collaboration group is in a third-party (3P) network. This can involve querying a third-party application or service hosted on a third-party server to return a list of members. This could require authentication of the host user that is creating the conference to ensure that the host user has access to the group list, and the identification information for the host user (and any authentication information specific to the third-party application) may be provided by the conferencing server to the third-party server. For example, the host user may register with the conferencing application to use third-party hosted groups by providing authentication information of the host user for the third-party application (e.g., Facebook) to the conferencing application hosted at the conferencing server.

If it is determined that the collaboration group is in a 3P network, flow branches "YES" to operation 325 where a meeting address is sent to a set of attendees for the meeting. If the collaboration group is in a third-party network (e.g., flow branching to operation 325), a 3P server associated with the 3P network may verify an identity of a host user at the invitation stage. An example of the collaboration group being in a third-party network is shown in FIG. 2B with client device A and client device D. The third-party server may access the group membership status information directly in a third-party data store or by querying, within the third-party network, a directory service. In examples, the collaboration server may query the third-party server (e.g., by forwarding the host user's identification information to the third-party server or prompting the host user to send their identification information directly to the third-party server) to verify that a host user has access to the collaboration group within the third-party network. Thus, at the invitation stage, for a 3P network collaboration group, a host user's access to the third-party group may be verified and a meeting address may be sent to the set of attendees without secondary authentication information (e.g., without an access key or any other information to verify a user's identity or group membership).

If it is determined that the collaboration group is not in a 3P network at determination 330, flow branches "NO" to operation 335, where meeting information and a meeting key is sent to the set of attendees. In an example, a collaboration group is not in a 3P network or in the collaboration network if no group lookup is available to either the in-network server or a third-party server (e.g., individual email addresses or identifiers). Flow to operation 335 indicates that the membership status of users in the collaboration group is not accessible in-network and also not in a 3P network. This may be due to membership information being stored in an inaccessible or uncooperative location (e.g. a 3P server not in communication with the in-network server). In another example, a collaboration group may not be in-network or in-3P-network if a user's identity is unidentifiable in either network (e.g., the user is not in in the network or the 3P network, an example of which is shown in FIG. 2C with client device A and client device E). Because either the identity or the membership status of a user is unknown at operation 335, secondary authentication information may be used to determine a user's authorization to access a meeting (e.g., an access key may be provided to the user when sending the meeting address).

At operation 340, a request from an attendee is received to access the meeting. This request may be received by the attendee accessing or selecting the meeting address. The request may be made at a date or a time near a meeting window, meeting start time, or meeting end time associated with the meeting (e.g., as may be set by a host user when creating the meeting). In examples, the request to access the meeting includes at least an identification of the attendee. For example, if the collaboration group included the email address of the attendee, the request to access the meeting includes at least an indication of such email address of the attendee that can then be used to check group membership for authentication purposes, as described further herein. Alternatively, the request to access the meeting may include some other identification of the attendee, such as an identifier for a device associated with the attendee that was used to login, as the attendee, to the conferencing server or the network. Further, meeting information and a meeting key may, in examples, be sent to only attendees who are not part of the group that is specified in the meeting invitation. For example, if a host user creates a conference invitation that names an attendee group and also separately lists individuals (not part of the group), then the invited attendees who are members of the group may be sent invitations as described above (meeting address only, without secondary authentication information), while the individually invited attendees may receive both the meeting address and secondary authentication information (such as a meeting key). In this manner, authentication of the attendees when they seek access to the conference may differ depending on whether they were invited as members of a group or otherwise, as explained below.

At operation 345, authorization of the attendee to access the meeting is verified. As described herein, if the collaboration group is in-network, an attendee's identity and membership status may be verified by the in-network server. If the collaboration group is in a 3P network, an attendee's identity and membership status may be verified by a 3P server and then communicated to the conference server. For example, the in-network server may outsource verification to the 3P server by receiving user identification information from a user at the in-network server and sending a request to the 3P server to verify an identity and group membership associated with the user identification information. Alternatively, the 3P server may direct the user to send the user identification information directly to the 3P server and request verification from the 3P server. The 3P server may verify a user's identity and membership status using similar methods described for the in-network server. If the collaboration group is not in the network and not in the 3P network, an attendee may be authorized to access the meeting based on secondary authentication information received at the 3P server or in-network server. This operation 345 is further described in FIG. 3B. At operation 365, in response to verifying authorization of the attendee, the attendee is provided access to the meeting. As further described herein, access to the meeting may be associated with access permissions provided to the attendee or the group in which the attendee is a member.

Continuing the above teacher-student-parent collaboration environment example, a meeting may be a virtual classroom with the teacher as the host user and Students A-Z in the class with Parents A-Z. The teacher may create a class meeting and invite a first collaboration group with a first access permission (Students A-N with access permission to listen, talk, and share video) and a second collaboration group with a second access permission (Parents A-N with listen-only permission). At operation 365, Student G, a member of the first collaboration group, is allowed access to the meeting with the first access permission (e.g., listen, talk, and share video). Alternatively, at operation 365, Parent H, a member of the second collaboration group, is allowed access to the meeting with the second access permission (e.g., listen-only).

Operations 340-365 may repeat as required or desired. For example, the operations may repeat for each attendee requesting to access the meeting. A single attendee may request to access the meeting more than once (e.g., if the attendee leaves the meeting and requests to re-enter the meeting) and the operations 340-365 may repeat to re-verify access authorization. Additionally, operations 340-345 may repeat. For example, if a user is not authorized to access a meeting (e.g., identification of the user is not verified or an identified user is not a member of the collaboration group), access to the meeting is not provided and the user may re-submit a request to access the meeting (e.g., using different user identification information or after becoming a member of the collaboration group).

FIG. 3B further describes operation 345 of FIG. 3A and illustrates an example method for verifying authorization of the attendee to access the meeting. Operation 345 of FIG. 3A is described at operations 346-360 of FIG. 3B. At operation 346, attendee credentials are received. Attendee credentials may include user identification information, device identification information, or any other information for verifying an identity of the attendee. The credentials may be manually provided by the attendee at a client device or may be detected by the in-network server hosting the meeting. For example, attendee credentials may be identified when the attendee's device connects to the network (e.g., when a user logs in to the network). The detection of attendee credentials by the in-network server may be automatic.

At determination 348 it is determined if the attendee is in the network. The attendee credentials may be compared with stored user credentials in a data store. In the example system shown in FIG. 1, client device A 110, client device B 115, and client device C 120 are in the conference network 105. If it is determined that the attendee is not in the network, flow branches "NO" to determination 350. Alternatively, if it is determined that the attendee is in the network, flow branches "YES" to determination 349. At determination 349, it is determined if the collaboration group associated with the meeting to which the attendee is requesting access is in the network. Information about the collaboration group may be accessed at a data store associated with the meeting. For example, group information may be associated with the meeting address of a data store in the network.

If it is determined that the collaboration group is in the network, flow branches "YES" to operation 352A. If, however, it is determined that the collaboration group is not in the network, flow branches "NO" to determination 350. At determination 350, it is determined if the group is in a third-party network. In an example, the information about the collaboration group at the in-network data store may include information about where attendee information about a collaboration group is stored. For example, information associated with a meeting hosted in-network may indicate that information about the collaboration group invited to the meeting is stored on a third-party network. The specific third-party network may be identified. Alternatively, an in-network server may search and send requests to one or more third-party servers to determine if the third-party server has access to information relating to the collaboration group. If it is determined that the collaboration group is in a third-party network, then flow branches "YES" to operation 352B. If, however, it is determined that the collaboration group is not in a third-party network, then flow branches "NO" to operation 355, where an attendee access key is received to verify the attendee's identity and authorization to enter the meeting. The access key may be requested after the determination of operation 348. At operation 357, the attendee's access key is verified. In an example, the access key may be verified based on comparing the key with identification information stored in an in-network data store (e.g., which may be associated with specific user credentials).

At determination 359, it is determined if the access key is verified. If the access key is verified, flow branches "YES" to operation 365 in FIG. 3A. If, however, the access key is not verified, then flow branches "NO" to operation 360 where access to the meeting is denied. Additionally or alternatively, if flow branches "NO" at determination 359, flow may branch back to operation 355, where the attendee may either re-enter attendee credentials or re-enter an access key, respectively. Alternatively, if the attendee desired to enter a different meeting, flow may branch to operation 340 in FIG. 3A where the attendee may request access to a meeting. As discussed above, at the invitation stage, invitees may receive different information from the conference server depending on whether certain invitees were invited as members of a group while others are invited outside of group membership. As such, within the same conference, different invitees may be authenticated differently (e.g., verified group members need not present a meeting key, while invitees who are not part of a group may be required to authenticate using a meeting key or other secondary authentication). Additionally, if an invitee is verified by an access key (e.g., operations 355, 357 and determination 359), rather than using group membership information (e.g., operations 356A, 356B described below), a host may also confirm access prior to allowing the invitee to access the meeting.

At operation 352A, attendee credentials are compared with stored attendee information to verify the attendee's identity. As described herein, the attendee's identity may be verified based on user identification information (e.g., username, login, email, phone number, PIN, or other user-specific information) or based on device information (e.g., IP address, MAC address, etc.). In an example, a user's identity may be verified based on a directly lookup, such as lightweight directory access protocol (LDAP), active directory, etc.

At determination 354A, it is determined if the attendee's identity is verified. The attendee's identity is verified if the attendee credentials match with stored attendee information. If the attendee's credentials do not match with stored attendee information (e.g., the attendee's identity is not verified), flow branches "NO" to operation 360 where access to the meeting is denied. Additionally or alternatively, if flow branches "NO" at determination 354A, flow may branch back to operation 346 where new attendee credentials may be received.

If, however, the attendee's credentials match with stored attendee information (e.g., the attendee's identity is verified), flow branches "YES" to operation 356A. At operation 356A, identified attendee information is compared with membership information for the collaboration group. An in-network data store may store information for the collaboration group, including membership information. Additionally or alternatively, the in-network data store may store membership information for one or more collaboration groups in association with in-network users (or attendees). If the collaboration group is on an ad hoc basis, the stored information for the collaboration group may be determined based on the set of attendees sent a meeting invitation (e.g., the set of attendees identified by the host user at operation 315 in FIG. 3A). For example, information about the set of attendees may be stored in association with the invitation sent to the set of attendees (e.g., at operation 325 and operation 335 in FIG. 3A). For an ad hoc collaboration group, the membership information may be updated if the host user updated the invitation. If the collaboration group is not ad hoc (e.g., a preestablished collaboration group or a collaboration group created and stored for purposes other than just the meeting invitation), membership information may be determined by querying the data store of the network storing information about the collaboration group. For collaboration group that is not ad hoc, the membership information may be updated by updating the information at the data store.

If, however, at determination 350 it is determined that the collaboration group is not in the network (e.g., is in a third-party network), flow branches "NO" to operation 352B. At operation 352B, attendee credentials are verified with a third-party server. The in-network server may forward the attendee credentials to the third-party server for verification or the in-network server may direct the attendee to send the attendee credentials to the third-party server directly.

At determination 354B, it is determined if the attendee's identity is verified by the third-party server. The attendee's identity is verified if the in-network server receives verification of the attendee's identity from the third-party server. If the attendee's credentials are not verified by the third-party server, flow branches "NO" to operation 360 where access to the meeting is denied. Additionally or alternatively, if flow branches "NO" at determination 354B, flow may branch back to operation 346 where new attendee credentials may be received.

If, however, the attendee's credentials are verified by the third-party server, flow branches "YES" to operation 356B. At operation 356B, the identified attendee's membership status in the collaboration group on the third-party server is verified. The in-network server may request membership status in a collaboration group from the third-party server based on the verified attendee credentials.

At determination 358, it is determined if the attendee is a member of the collaboration group. Membership status may be determined based on the comparison at operation 356A at the in-network server or based on a verification received from a third-party server at operation 356B. If it is determined that the attendee is member of the collaboration group, then flow branches "YES" to operation 365 of FIG. 3A. As such, in examples, the admission of the attendee into the collaboration conference may be based solely on whether the attendee is (at the time the attendee is seeking access to the collaboration conference) a member of the group included in the invitation. If, however, it is determined that the attendee is not a member of the collaboration group, flow branches "NO" to operation 360 where the attendee is denied access to the meeting. Additionally or alternatively, if flow branches "NO" for determination 358, flow may branch back to operation 346 where new attendee credentials may be received.

Continuing the above teacher-student-parent collaboration environment example, a meeting may be a virtual classroom with the teacher as the host user and Students A-Z in the class with Parents A-Z. The teacher may create a class meeting and invite a first collaboration group with a first access permission (Students A-N with access permission to listen, talk, and share video) and a second collaboration group with a second access permission (Parents A-N with listen-only permission). Student A, a member of the first collaboration group, is determined to be in the collaboration group (e.g., at determination 358) and is allowed access to the meeting with the first access permission (e.g., at operation 365). Parent B, a member of the second collaboration group, is determined to be a member of the second collaboration group (e.g., at determination 358) and is allowed access to the meeting with the second access permission (e.g., at operation 365). Alternatively, Student Q, not a member of either the first collaboration group or the second collaboration group, is determined to not be a member of any collaboration group (e.g., at determination 358) and is denied access to the meeting (e.g., at operation 360). Similarly, Parent Y, not a member of either the first collaboration group or the second collaboration group, is determined to not be a member of any collaboration group (e.g., at determination 358) and is denied access to the meeting (e.g., at operation 360).

Additionally, if flow branches "NO" for determinations 354A, 354B, 358, or 359 an error message may be sent to the attendee to indicate that access to the meeting was denied. Additionally, the error message may indicate a reason why access to the meeting was denied (e.g., at operation 360). For example, if flow branches "NO" at determinations 354A, 354B, or 359, an error message may indicate that the attendee's identity was not verified. In another example, if flow branches "NO" at determination 358, an error message may indicate that the attendee is not a member of the collaboration group.

FIG. 4 illustrates an example method for changing a set of group members in a collaboration group. As otherwise described herein, a conference group for a conference or meeting includes a set of group members which includes one or more member (otherwise referred to as a user or attendee of the set of group members). The set of group members for a conference group (other referred to as a collaboration group or conference contact list) may be selected or constructed based on the systems and methods disclosed above.

A group (sometimes referred to herein as a collaboration group) may be initially constructed by a group owner or by a server. A group owner may be a creator of the group or an administrator of the group. In the case of a conference group constructed by a group owner, group members may all be connected to the conference network ("in network") or the group members may not all be connected to the conference network ("out of network"). The group owner may select group members from a contact list. Additionally or alternatively, group members may be selected based on a shared attribute. For example, conference group members be part of an educational class, a project, a social group, a contact list (e.g., email contact list, phone number contact list, device contact list, etc.), an employer, an organization, a development team, a job title, a group on a third party application (e.g., Facebook®, LinkedIn®, Slack®, Microsoft Teams®, Zoom, etc.), or any other common feature or characteristic. Owner-created groups may be established before, after, or concurrent with setting up a conference for which the group is invited.

Alternatively, a server may construct a group. The server may construct a group based on common attributes of users, pattern recognition (e.g., users associated with a type of meeting or meetings associated with specific key words), previous owner-created groups, etc. Similar to owner-created groups, server-created groups may be established before, after, or concurrent with setting up a conference for which the conference group is invited.

If a conference group already exists (e.g., as created by a group owner or a server, as described above), the set of group members may change. The set of group members may change based on a change made by the group owner, the server, or based on a request from a user. For example, an attendee (e.g., member of the set of group members for a group) may wish to leave a conference group for which they are a member. Alternatively, a prospective attendee (e.g., not a member of the set of group members) may wish to join a conference group.

The method 400 illustrates a user request to change their membership status with a group. The method 400 begins at operation 405, where a pre-existing group and a membership status for a user associated with the pre-existing group is provided to the user. For example, if the user is a member of the group, the user may be provided with an "active" membership status for the group. Alternatively, if the user is not a member of the group, the user may be provided with an "inactive" membership status for the group. Although operation 405 indicates providing a user with "a" group, providing any number of groups is appreciated (e.g., two groups, two or more groups, three groups, four groups, five groups, ten groups, 15 groups, all groups with "active" status, all groups with "inactive" status, all groups regardless of membership status, or any other number of groups).

At operation 410, a request from the user is received for a change of a membership status for the group. For example, a user may request changing their membership status from "inactive" to "active," or vice versa. Although two membership status options are used here (e.g., active and inactive) other status options should be appreciated (e.g., blocked, temporary, etc.).

At determination 412, it is determined if the requesting user is authorized to make the request for change of membership status. For example, the group be associated with status change permissions that may restrict some users to request a change to their group membership status. For example, status change permissions may prevent users from requesting to leave the group, be added to the group, or both. Status change permissions may be user-specific, status-specific (e.g., users with "active" status or "inactive" status), or group-specific. For example, user A may not be authorized to request any change in their membership status (e.g., user-specific change permissions). In another example, an "active" member of a group may be allowed to request to leave the group (e.g., change in membership status from "active" to "inactive"), but an "inactive" member of a group may not be allowed to request "active" status, or vice versa (e.g., status-specific change permissions). As another example, a group may be associated with status change permissions that allow any user, limited users, or no users, to request a membership status change (e.g., group-specific change permissions). If the requesting user is not authorized to request a change to their membership status, it is determined that the user is not authorized and flow branches "NO" to operation 413, where the membership status of the user is maintained (e.g., the membership status is not changed). The user may then be notified of their membership status at operation 440.

If, however, it is determined that the requesting user is authorized to request a change to their membership status, flow branches "YES" to determination 415. At determination 415, it is determined if the request is sent to a group owner for review. This determination 415 may be made at the time the request is received. If the group does not have a group owner or is an "open" group that allows change of membership status of an attendee freely (e.g., without restriction), it is determined that the request is not sent to a group owner and flow branches "NO" to operation 435, where the membership status of the user for the group is updated. In an example, the membership status may be updated and stored in a data store of a network for access and look-up by a server.

If, however, it is determined that the request is to be sent to the group owner for review, flow branches "YES" to operation 420. At operation 420, the request is provided to the group owner of the group. The group owner may accept, conditionally accept, deny, or conditionally deny the change in membership status. Other responses should be appreciated, such as selection of a different status option for the user. The group owner may also include a memo associated with the response. The memo may be stored for later view (e.g., the group owner may be provided with past memos associated with past requests from the user in addition to being provided the user request). At operation 425, the response from the group owner is received, based on the user request. If a memo from the group owner is also received in association with the response to the request, the memo may be forwarded to the requesting user.

At decision 430, it is determined if the response from the group owner accepts the user-requested change in membership status of the user for the group. If the response received from the host does not accept the requested status change of the user, then the method 400 branches to "NO" and no change is made to the user's membership status for the group. If, however, the response from the group owner accepts the user-requested change in membership status for the group, flow branches "YES" to operation 435 where the membership status of the user for the group is updated. For example, a user's membership status may be updated from "inactive" to "active" or vice versa. Although two membership status options are used here (e.g., active and inactive) other status options should be appreciated (e.g., blocked, temporary, etc.).

At operation 440, the user is notified of their membership status. The membership status may be based on the response received from the group owner at operation 420. Additionally, the user may be notified if their membership status changed.

In an example, a host user schedules a meeting and invites members of group P, an in-network group. At the time the meeting is scheduled, the members of group P include user J, user K, and user L. As further described in FIG. 3A at operation 325, a meeting address for the meeting (e.g., an invitation to join the meeting) is sent to user J, user K, and user L. In this example, user L is removed from group P (e.g., based on the method described in FIG. 4), before the meeting but after the invitation is sent. At operation 340 in FIG. 3A, a request to access the meeting may be received from user J and user L. Attendee credentials are received for both user J and user L (e.g., at operation 346 in FIG. 3B). Because group P is in-network, the attendee credentials of user J and user L are compared with stored attendee information to verify the identity of user J and user L (e.g., at operation 352A in FIG. 3B). Assuming that the identity of user J and user L are verified, the identified user J and identified user L are compared with collaboration group membership information for group P (e.g., at operation 356A). Because user J is still a member of group P (e.g., user J has an active membership status) at the time user J requested to access the meeting, user J is verified to be a member of group P (e.g., at determination 358) and is granted access to the meeting. Because user L is no longer a member of group P at the time user L requested to access the meeting, user L is not determined to be in group P (e.g., at determination 358) and is denied access to the meeting. Thus, access to the meeting is determined based on a membership status of a requesting user at the time the access is requested, rather than simply at the time the invitation was generated.

Adding to the above example, say user M is added to group P after group P is invited to the meeting. Assume user M acquired the meeting address (e.g., user M may be sent a meeting invitation for any or all upcoming meetings for group P after becoming a member of group P). User M, requesting access to the meeting after becoming a member of group P, is granted access to the meeting, despite not being a member of group P at the time group P was invited to the meeting. Although these examples are for an in-network group P, similar examples may be applied to a third-party group.

Figure 5:
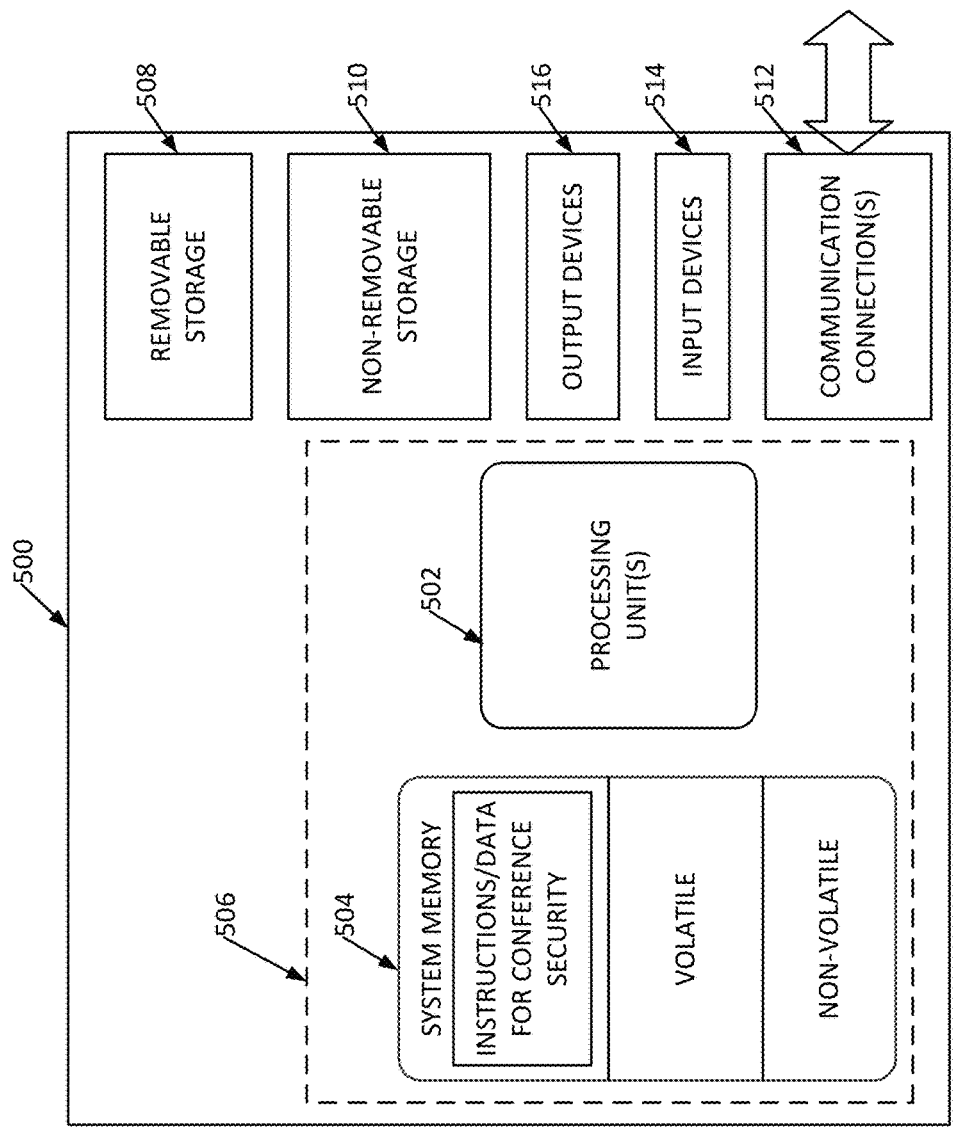
FIG. 5 illustrates an example of a suitable operating environment in which one or more of the present embodiments may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as the methods illustrated in FIGS. 3A, 3B, and 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general-purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for conference security based on an in-network group, the method comprising:
    receiving instructions at a server to schedule a virtual meeting and to invite a group to the meeting;
    determining, by the server, that an indication of the group is stored in a network associated with the server;
    sending a meeting address from the server to a first user device associated with a first user in the group;
    receiving, at the server, a request from the first user device to access the virtual meeting; and
    authorizing the first user device to access the virtual meeting, by the server, based on a membership status of the first user with the group.

2. The method of claim 1, wherein the group consists entirely of a set of attendees.

3. The method of claim 1, wherein determining that the group is in the network includes determining that the first user of the group is in the network.

4. The method of claim 1, wherein the group includes a contact list of an administrative user.

5. The method of claim 4, wherein the contact list is associated with one of:
    a social interest;
    an education class; or
    an organization.

6. The method of claim 1, the method further comprising:
    in response to authorizing the first user to access the virtual meeting, providing, from the server to the first user, access to the virtual meeting.

7. The method of claim 1, wherein the meeting address is a uniform resource locator (URL).

8. The method of claim 1, wherein authorizing the first user to access the virtual meeting comprises:
    verifying an identity of the first user.

9. The method of claim 8, wherein the identity of the first user is verified based on a user credential, the user credentials including one of:
    a username;
    an email address;
    an internet protocol (IP) address of a device of the first user; or
    a media access control address (MAC) address of the device of the first user.

10. The method of claim 9, wherein verifying the identity of the first user comprises:
    receiving, at the server, the user credential from the first user; and
    comparing the user credential with stored user information in a data store in the network.

11. The method of claim 8, wherein authorizing the first user to access the virtual meeting further comprises:
    verifying a membership status of the first user for the group.

12. The method of claim 11, wherein verifying the membership status is based on the verified identity and further includes:
    comparing the verified identity with stored membership information in a data store in the network.

13. The method of claim 11, wherein authorizing the first user to access the virtual meeting includes implementing a lightweight directory access protocol (LDAP).

14. The method of claim 1, wherein the virtual meeting is a teleconference.

15. The method of claim 1, wherein the membership status is one of:
    active; or
    inactive.

16. The method of claim 1, wherein the virtual meeting is associated with an access key, the method further comprising:
    receiving, at the server, a request from a second user device to access the virtual meeting, the second user device associated with a second user not in the set of attendees; and
    authorizing the second user device to access the virtual meeting, by the server, based on a meeting key received from the second user device.

17. The method of claim 16, wherein authorizing the second user device to access the virtual meeting is further based on an indication received from a host device of the virtual meeting.

* * * * *